Figure 5:
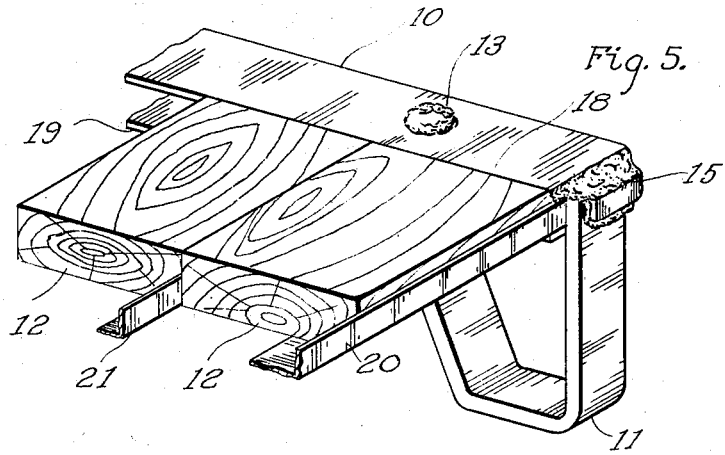

Aug. 9, 1938.                G. QUAYLE                 2,126,278
                        ALL-WELDED SKID PLATFORM
                        Filed Aug. 4, 1934          2 Sheets-Sheet 1
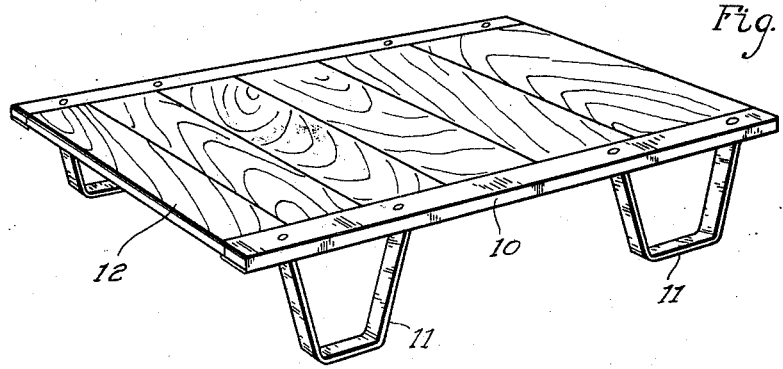
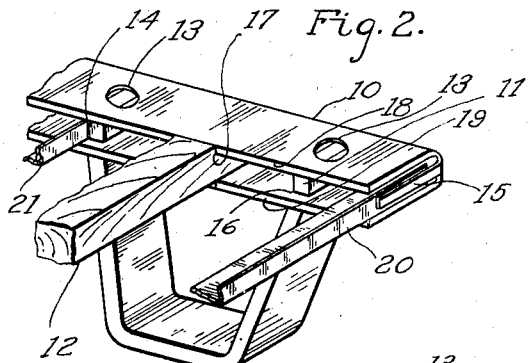
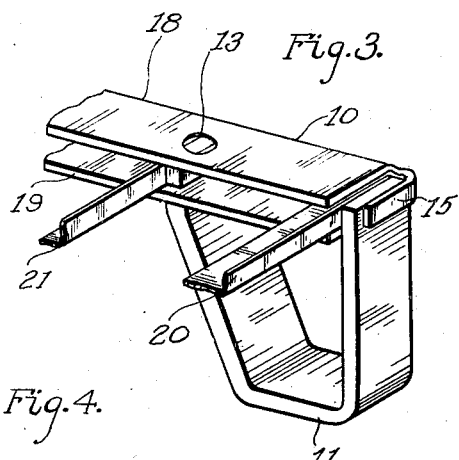
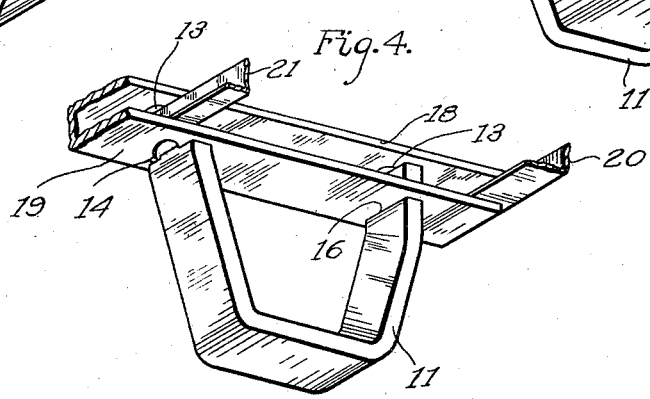
INVENTOR
George Quayle
BY
ATTORNEY Aug. 9, 1938.    G. QUAYLE    2,126,278
ALL-WELDED SKID PLATFORM
Filed Aug. 4, 1934    2 Sheets-Sheet 2

INVENTOR
George Quayle
A. H. Golden
ATTORNEY

Patented Aug. 9, 1938

2,126,278

UNITED STATES PATENT OFFICE 2,126,278

ALL-WELDED SKID PLATFORM

George Quayle, Philadelphia, Pa., assignor to The Yale & Towne Manufacturing Co., Stamford, Conn., a corporation of Connecticut Application August 4, 1934, Serial No. 738,486

3 Claims. (Cl. 248—120)

This invention relates to skid platforms. More particularly, it relates to skid platforms of the type having a wood floor bound by steel channel members and equipped with legs for supporting it in spaced relation to the floor and ground.

Skid platforms have been manufactured in various ways. One method comprises forming the skid platform from a series of wood floor members and binding each edge of the floor by a pair of related angle members which are clamped relatively to the wood floor by a series of bolts. A skid platform of this type is shown in the Stuebing Patent 1,575,462 owned by the same assignee, to which this application is also assigned. Skid platforms of the type shown in this Stuebing patent are very reliable and form a large percentage of the platforms actually used in commercial work. However, they have the disability of the bolts being inclined to loosen, requiring frequent tightening which is neglected in most large establishments. Also, in this type of platform, quite a number of bolts are required and the expenditure for labor is therefore somewhat of a factor. Moreover, the bolts protrude somewhat, and unless an expensive construction is utilized, this protruding cannot be avoided.

The principle of the particular type of platform just described has been utilized recently in a new all welded type of platform in which the associated angle bars are welded along their overlapping sides as illustrated in the Stuebing Patent 1,836,885 also assigned to the assignee of this application. The type of platform shown by Stuebing in this patent is exceedingly desirable and also forms a considerable part of the actual platforms used in commercial work. However, in this type of platform the flanges of the welded channels are difficult to maintain in binding relation to the skid platform and there is no way to tighten them into binding relation should they work free in use. Therefore, it is possible if great care is not taken in manufacture for the boards to become loose in the channels with no means available for tightening as in the case of a bolted platform.

In addition to the types of platforms described, there are in the art many types of steel platforms comprising steel floors, and steel supporting members welded to the platform floor. However, such platforms are not at all resilient, are difficult to handle, and are considerably more expensive than all-wood platforms bound by steel members.

It is the object of my invention to devise a platform which will have all the advantages of the bolted form of platform while lacking its disadvantages, and will have also all the additional advantages of the all welded platform without also having some of its disadvantages. Briefly, my invention comprises using channel members adapted to be secured in clamped relation to the wood floor, the flanges of the channel members being adapted for welding while in this clamping relationship. Preferably, a wooden floor is used and is cut out for permitting a transverse member to be placed between the flanges and to be welded to the flanges while they are in clamping relation to the wood floor.

More in detail, the invention comprises binding the edges of the floor members with a channel member, the flanges of which are adapted to be welded together in floor binding relationship by a member traversing one of the flanges and abutting the other flange. Even more particularly, the preferred arrangement of my invention utilizes the legs of the platform as the traversing binding members. The welding of the flanges to the legs serves not only to bind the flanges in floor clamping relationship, but also as the means for securing the legs to the platform.

My invention includes also means for reinforcing the platform by utilizing cross members. An additional feature of the invention includes the utilization of novel types of piercings in the flanges of the channel members whereby to facilitate welding.

While I have indicated that my invention preferably utilizes channel members, it is possible to utilize instead the overlapping angle members of the Stuebing Patent 1,836,885 cited, these members to be welded along their overlapping edges and then to be welded in accordance with the principles of my invention described herein.

Figure 6:
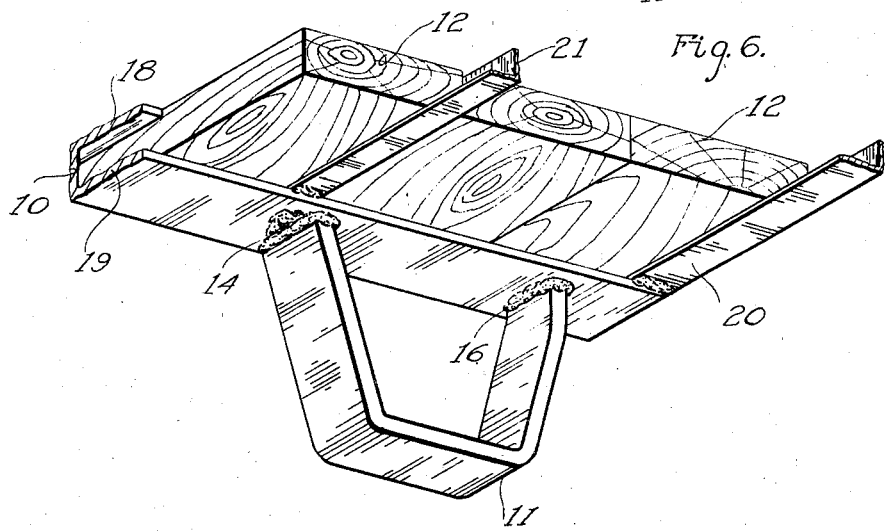
Figure 8:
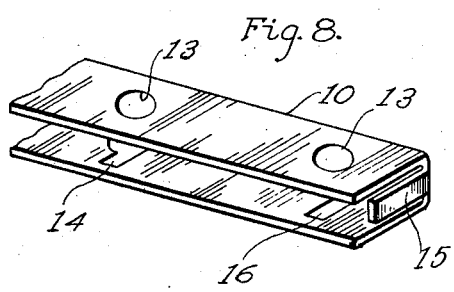
Figure 7:
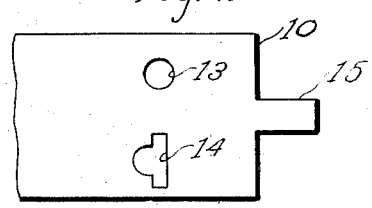
Figure 9:
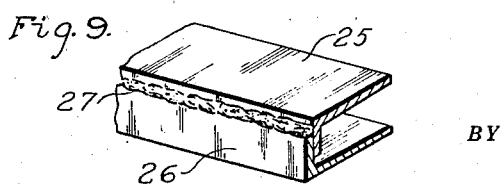

In order to more particularly indicate the specific construction of a preferred embodiment of my invention, I shall now refer to the drawings wherein Fig. 1 is a perspective view of a platform embodying my invention. Fig. 2 shows one modification of my invention with the wood floor members generally removed and the parts shown in their relation prior to welding. Fig. 3 shows another modification held in assembled relation with the floor members removed and the parts as positioned prior to welding. Fig. 4 is an under-perspective view of parts of my invention prior to welding. Fig. 5 shows the parts of Fig. 3 welded and with the wood floor members in position. Fig. 6 is an under-view of the parts of Fig. 2, but with the wood floor members entirely in position and the entire assembly welded. Fig. 7 illustrates the blank form of the channel member utilized as in Fig. 3 while Fig. 8 illustrates the type of channel member used in Fig. 2 and formed from a blank similar to that shown in Fig. 7. Fig. 9 illustrates the use of overlapping angle members of the type shown in Stuebing Patent 1,836,885 referred to, and which may be utilized instead of the one-piece channels of Figs. 7 and 8.

Referring now more particularly to the drawings, reference numeral 10 in Fig. 1 indicates one of the channel members in which are welded the legs 11, the channel member being in clamping relationship to the wood floor members 12 of the platform. Referring now to Figs. 7 and 8, it will be seen that the channel members 10 originally are flat and are pierced as illustrated and indicated by reference numerals 13 and 14. The hole 13 is adapted to be pierced in that part of the blank which is to form the upper flange 18 of the channel member 10 while the peculiar piercing 14 is adapted to be made in the lower flange 19 of the channel member 10. The tab member 15 is formed at the end of the channel 10 and is utilized as an end welding member as shown in Figs. 2 and 3 and as will be indicated later on.

Fig. 8 shows a channel member after it has been bent from a flat form similar to that of Fig. 7. The channel member in Fig. 8 is adapted for the modification of Fig. 3. It will be readily apparent that the channel in Fig. 8 is also pierced in its upper flange portion 18 to form the holes 13 while one of the piercings in the lower flange is formed like piercing 14 in Fig. 7. The other of the piercings in the bottom flange is merely in the form of a slot 16.

Referring now to Fig. 2, it will be seen that the channel member 10 is placed in position, the wood floor members 12 being cut away as at 17 so as to fit between the upper flange 18 and the lower flange 19 of the channel. A leg member 11 is adapted to traverse the slot 16 in the lower flange 19 and to abut the upper flange in juxtaposition and in under-relation to the piercing 13. The other foot of the leg is adapted to traverse the lower piercing 14 and to abut the upper flange 18 in under-relation to the piercing 13.

Cross reinforcing members 20 and 21 are placed in reinforcing relation to the leg member 11 and to the upper and lower flanges 18 and 19 respectively of the channel 10. The reinforcing member 20 is preferably placed in close alignment to the tab member 15 formed at the end of the channel member 10 so as to be welded thereto. Fig. 4 is an under-view of the parts of Fig. 2 and illustrates just how the leg is adapted to enter the piercings 14 and 16 in the lower flange 19.

Referring now to the modification of Fig. 3, the parts therein are shown in assembled relation but unwelded. The leg member has one end fitting between the tab 15 and the end reinforcing member 20 while its other leg is adapted to enter a piercing 14 and to abut the upper flange 18 in under-relation to the piercing 13. The cross member 21 is placed in close relation to the leg 11 and the upper and lower flanges 18 and 19 so as to be welded thereto as will be quite apparent.

Referring now to Fig. 5, there is illustrated the platform of Fig. 3 after it is welded. The hole 13 is now filled with welded material so as to give the flange 18 of the channel member a complete outside surface. The leg member is welded at its other end to the tab member 15 and to the cross reinforcing member 20 and the flanges 18 and 19 of channel 10. It will be understood that the welding in Fig. 5 takes place while the upper and lower flanges 18 and 19 of the channel member 10 are held by some type of clamping tool in clamped relationship to the floor boards 12, the flanges being generally capable of some flexing, although that is not absolutely essential to the invention since the wood may be forced into the channel and into binding relation to the flanges 18 and 19.

Thus, when the welding is completed as in Fig. 5, the effect will be the same as though the upper end of the leg were a bolt in the modification illustrated in the Stuebing Patent 1,575,462 referred to supra. The welding of the leg to the upper and lower flanges will securely bind those flanges to the floor boards as though the leg were a bolt, but the leg will have the advantage of being permanently secured and incapable of becoming loose, thus obviating a disadvantage of the bolted construction.

Fig. 6 is an under-view of the modification of Fig. 2 when welded, showing the leg 11 securely welded at the points where it traverses the flange 19 through the piercings 14 and 16. Here also, the piercing 14 is shown completely filled in by welded material so that the lower flange will also present a smooth surface.

In Fig. 9, I illustrate a modification in which a pair of angle members 25 and 26 are utilized and are welded as at 27 as well as between the horizontal flanges. This modification really utilizes the associated angle bars of the Stuebing Patent 1,836,885 referred to supra, and welded to form a channel member whose flanges may then be welded in platform binding relation.

I believe that I have made a basic improvement in the art of skid platforms whereby I am able to obtain the advantages of two successful types of platforms, while obviating some of the disadvantages of either type. It is my intention therefore to claim my invention broadly along the general lines outlined in the claims appended hereto.

I claim:

1. A skid platform of the type having a platform floor supported by a series of legs comprising a floor made up of a series of transversely extending floor members having horizontal flanges, metal channel members binding the upper and lower surfaces of the ends of said floor members and adjustable into clamping relation thereto, and vertical metal members between the inner surfaces of the flanges of said channel members and welded to said flanges with said flanges in clamping relation to the floor members whereby to fix said flanges in floor binding and clamping position, the transversely extending floor members being formed to allow for positioning of said vertical metal members between the said flanges.

2. A skid platform comprising a floor made up of a series of transversely extending floor members, a series of legs, metal channel members comprising metal angle bars having their horizontal flanges engaging respectively the upper and underfaces of said floor members and their vertical flanges overlapped and welded together, the lower horizontal flanges having openings, and portions of said legs extending through said openings and welded to the upper horizontal flange and to the lower horizontal flange to hold said channel members in clamping relation to said floor members.

3. A skid platform comprising a floor made up of a series of transversely extending floor members, a series of legs, metal channel members comprising metal angle bars having their horizontal flanges engaging respectively the upper and underfaces of said floor members, the lower horizontal flanges having openings, portions of said legs extending through said openings and welded to the upper horizontal flanges and to the lower horizontal flanges to hold said channel members in clamping relation to said floor members.

GEORGE QUAYLE.